2 Sheets--Sheet 1.

F. L. POPE.

Electric Signaling Apparatus for Railways.

No. 6,579. Reissued Aug. 3, 1875.

Witnesses:
J. S. Coombs
A. H. Norris.

Inventor:
Frank L. Pope
By his Atty.
James L. Norris.

2 Sheets--Sheet 2.

F. L. POPE.

Electric Signaling Apparatus for Railways.

No. 6,579. Reissued Aug. 3, 1875.

Witnesses:
J. L. Coombs
A. H. Norris.

Inventor:
Frank L. Pope,
By his Atty.
James L. Norris.

UNITED STATES PATENT OFFICE.

FRANK L. POPE, OF ELIZABETH, ASSIGNOR TO HIMSELF, JAMES N. ASHLEY, OF GREENVILLE, NEW JERSEY, STEPHEN C. HENDRICKSON, OF BROOKLYN, NEW YORK, AND JAMES D. LINCOLN, OF GREENVILLE, NEW JERSEY.

IMPROVEMENT IN ELECTRIC SIGNALING APPARATUS FOR RAILWAYS.

Specification forming part of Letters Patent No. 130,941, dated August 27, 1872; reissue No. 6,579, dated August 3, 1875; application filed July 23, 1875.

DIVISION B.

*To all whom it may concern:*

Be it known that I, FRANK L. POPE, of Elizabeth, in the county of Union and State of New Jersey, have invented certain new and useful Improvements in Electric Signaling Apparatus for Railroads; and I do hereby declare that the following is a full, clear, and exact description thereof, reference being had to the accompanying drawing, which forms part of this specification.

The invention set forth in this division consists, first, in the combination, with a visual signal, of an electro-magnet and armature, adapted to cause the signal to be displayed by a momentary action of a current, and then to hold the signal displayed so long as may be deemed necessary by the action of residual magnetism; and, further, in the arrangement of connections and circuits for arresting the action of the visual signal actuating-magnet, and restoring the signal to its normal position by means of a reverse current thrown through the helix or helices of the actuating-magnet, as will be more fully hereinafter set forth and claimed.

These means and principles may be applied to any desired visual signal; but I have here shown the invention with special reference to my improved system of electric railroad-signals—

Figure 1:
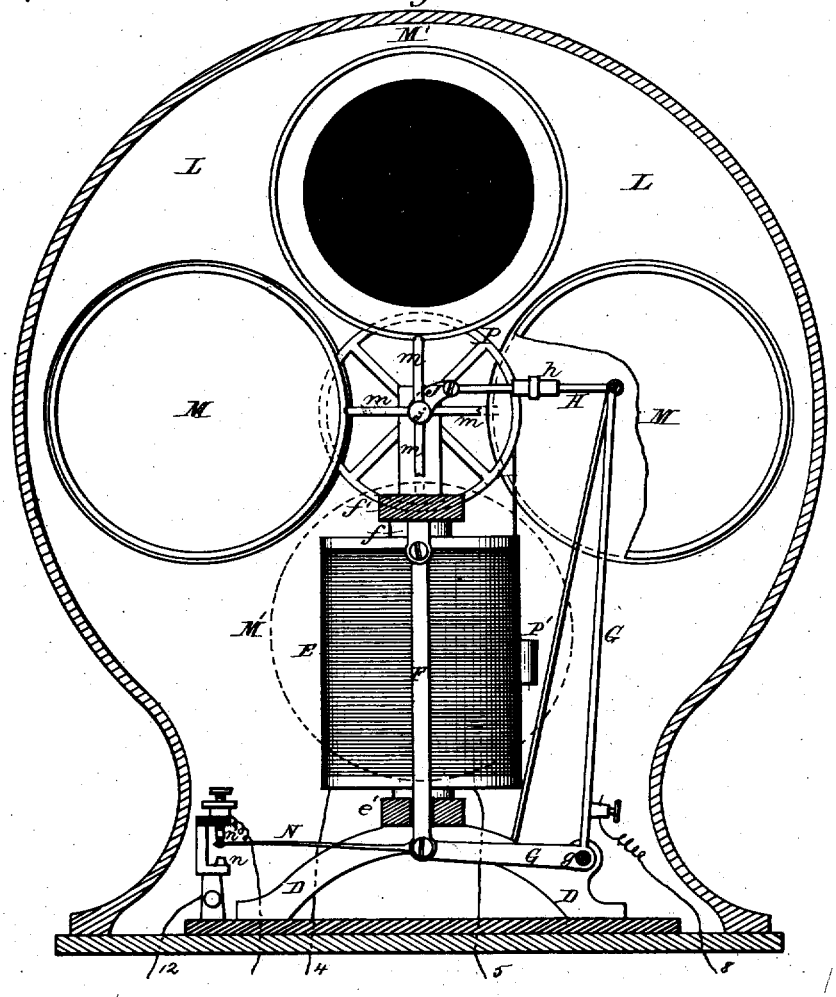
Figure 2:
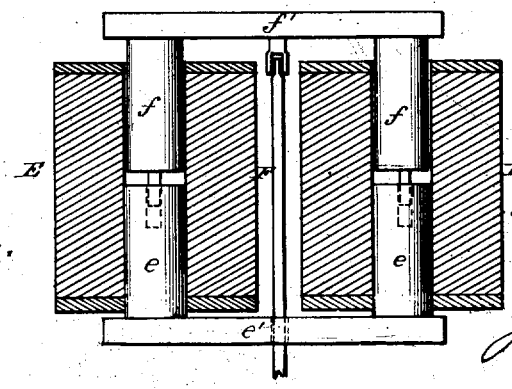
Figure 3:
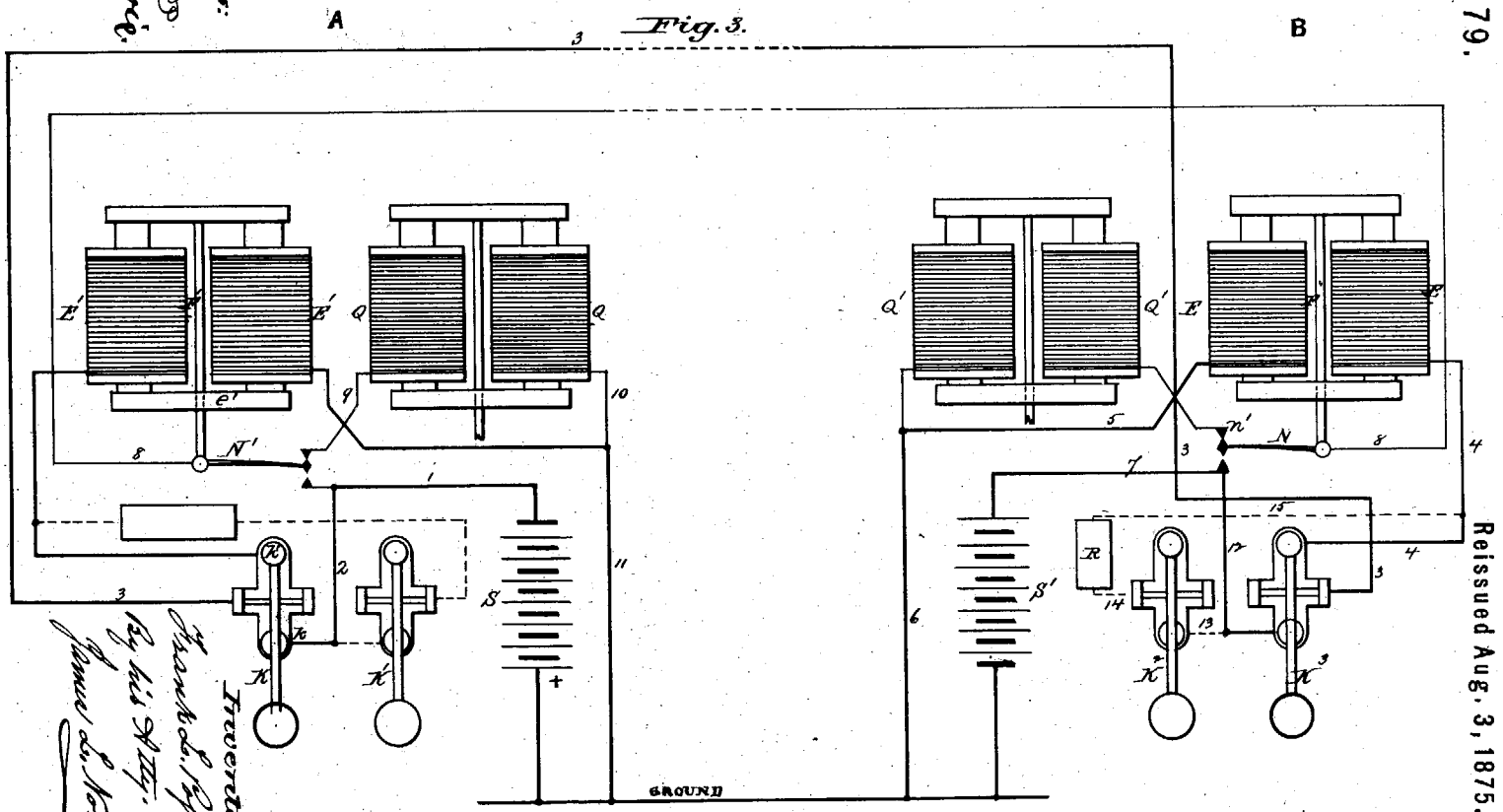

Figure 1 in the accompanying drawing is an elevation of the signal-box and signal mechanism, the box and a portion of the apparatus being shown in section. Fig. 2 is a detached sectional view, showing the construction of the magnet. Fig. 3 is a diagram, showing the arrangement of the electrical connections and the manner of operating the signals.

In Figs. 1 and 2, E E designate the helices of the electro-magnet which moves the signal apparatus. The soft-iron cores *e e* are of the usual cylindrical form, and are connected together by the soft-iron yoke *e'*, which is securely fastened, in any suitable manner, to the frame or support D D. The cores *e e* extend about half the length of the helices E E, and within them, as shown in Fig. 2. A second yoke, *f'*, also provided with cylindrical cores *f f*, which are movable longitudinally within the helices E E, constitutes the armature, and this armature is supported by a vertical rod, F, pivoted to an angular lever, G G, which turns upon an arbor at *g*, and at the opposite extremity of which is pivoted to the pitman-rod H of a crank, J. The crank J is secured to an arbor or shaft, *j*, which, as here shown, is provided with suitable bearings. The signal, as here shown, is composed of four circular disks or targets, M M M' M', constructed of some thin and light material, such, for example, as paper or oiled silk, stretched upon hooks of any suitable diameter. The signal is shown as inclosed in an opaque box, L, provided with two circular openings, O O, which permit the white disks M M to be seen from the exterior when the apparatus is in its normal position.

It will be readily understood that, if the arbor or shaft *j* be moved the distance of one-fourth of a revolution, the colored disks M' M' will be brought in front of the opening O O, and the white disks M M will be concealed, while a reversal of this movement will cause the white disks to be again displayed and the colored disks concealed.

The construction of the signal used need not be dwelt upon in this division, as it is evident that the principles of operation herein illustrated may be applied to any signal apparatus in which a signal is displayed by being moved or actuated by an electro-magnet.

When a current of electricity is sent through the helices E E the axial magnetic force developed thereby tends to draw the cores *f f* into the helices, while at the same time both sets of cores, *f f* and *e e*, become powerfully magnetized, and their mutual attraction acts in conjunction with the first-named force to bring them into contact with each other. The employment of the force of axial magnetism in this manner is found to materially increase the effective length of the stroke in the apparatus. The movement of the cores *f f* is transmitted through the vertical rod F, angular lever G, and pitman H to the crank J, which is so adjusted that the arbor or shaft *j* will be moved thereby through the distance of one-fourth of a revolution, and the colored disks or targets M′ and M′ will then be exhibited through the openings O O, instead of the white disks M M shown in the drawing. A pulley, P, provided with a cord, *p*, and a weight, *p′*, is also fixed upon the shaft *j*. The weight *p′* is sufficiently heavy to cause the apparatus to return to its normal position whenever the attraction between *e e* and *f f* ceases; but, inasmuch as these cores are permitted to come into absolute contact with each other, the residual magnetism which, by a well-known law of magnetic action, always remains in the soft iron under these conditions after the exciting current has ceased, prevents them from being separated by the action of the weight *p′*. If, now, a somewhat weaker electric current of opposite polarity be sent through the helices E E, the residual magnetism will be neutralized, and the attraction between *e e* and *f f* entirely destroyed, and the signal will at once return to its normal position by the action of the weight *p′* acting upon the pulley P.

Thus, it will be understood that an electric current sent through the helices E E in one direction will cause a signal to be shown through the openings O O, which will remain in position after the said current has ceased, and until a current of opposite polarity is sent through the said helices, when a white signal will be again shown.

I wish it to be understood that I do not confine myself to the particular mode of constructing an electro-magnet as shown in Fig. 2. The same result may be produced by the use of an electro-magnet of the ordinary form, in which the cores *e e* extend entirely through the helices E E, and their attraction is exerted upon a simple armature, *f′*, which, if necessary, can be guided in any suitable manner so as to come directly in contact with the ends of both cores *e e*; and I will further remark that the movable cores *f f* (shown in Fig. 2) may be extended nearly or quite through the helices E E, and the cores *e e* and yoke *e′* may be dispensed with, in which case the movement of the cores *f f* and yoke *f′* will be effected solely by axial magnetism.

A and B, Fig. 3, are supposed to represent two stations, situated at the opposite ends of a bridge, tunnel, or any section of a single track upon the line of a railroad. Each station is provided with a semaphoric signal, constructed and arranged as hereinbefore described, as well as a tell-tale or repeating signal, a battery, and two finger-keys of any suitable construction.

The manner in which the apparatus is operated is as follows: We will assume that the operator at A wishes to set signal at B; he then depresses the black key K, which closes the circuit at *k*. An electrical current from the negative or — pole of the battery S (its positive or + pole being permanently in connection with the ground) will pass through the wires 1 and 2 to the key K; thence over the line-wire 3 to station B; thence through the rear contact of key $K^3$ and wire 4 to the helices E E of the semaphoric signal-operating magnet, and thence to the ground by the wires 5 and 6. The passage of this current through E E will cause a signal to be displayed at B.

In order that the operator at A may know whether the signal at B is properly displayed, the latter is made to work a repeating signal or tell-tale at A. This is accomplished as follows: N, Figs. 1 and 3, is a flexible metallic arm, attached to the lever G of the signal, its extremity being placed between two metallic stops, *n* and *n′*, and so adjusted that when the apparatus is in its normal position it will be in contact with the stop *n′*; but when the apparatus is not in normal position the said arm will be brought in contact with the stop *n*. It will, therefore, be understood that when the signal at B has been set by the operator at A, as hereinbefore explained, the arm N will be brought in contact with the stop *n*. This contact will close the circuit and cause a current to pass from the battery S′ through the wire 7, arm N, line-wire 8, arm N′, and wire 9 to the helices Q Q at station A, and thence by wires 10 and 11 to the ground. The helices Q Q may be employed to operate any suitable form of tell-tale, repeating-signal, or alarm-bell, the particular arrangement adopted being immaterial, as the object of the device is merely to inform the operator at A that the semaphoric signal at B is in the desired position. The signal at B is held in position, after the operator at A breaks the circuit at the key K, by the action of the residual magnetism, as hereinbefore explained. When it is desired to unset the signal and restore the apparatus to its normal condition the operator at B depresses the white key $K^2$. This causes a current to pass from the positive pole of the battery S′ through the wires 7, 12, and 13 to the key $K^2$, and thence through the wires 14, 15, and 4 to the semaphoric helices E E, and thence by the wires 5 and 6 to the earth. This current, being of a polarity opposite to that by which the magnet was originally charged, neutralizes the residual magnetism, and permits the signal to resume its normal position, which latter operation breaks the circuit between N and *n*, and thereby releases the repeating-signal connected with Q Q, and notifies the operator at A that the signal has been unset at B, and restored to its normal condition. In case a signal is to be set at A the operation is precisely the same, but in a reverse direction. The operator at B depresses key $K^3$, and sends a current through the helices E′ E′ of the semaphoric signal-operating magnet at A, its movements being indicated by the repeating-signal connected with Q′ Q′. It will be observed that the signal at B, and consequently the tell-tale or repeating-signal at A having been once set by the operator at A, cannot be released or reversed by himself, but must remain in position until taken off by the operator at B at that station, and vice versa. It is necessary that the current of reverse polarity for neutralizing the permanent magnetism in the semaphoric magnets should be considerably weaker than the primary current. This result is accomplished by inserting a rheostat, R, into the circuit between the key $K^2$ and helices E E, by the aid of which the strength of the current can be modified or regulated at pleasure. The same result may be accomplished by using a smaller separate battery of suitable power, or by including only a small portion of the battery S′ in the reversing-current, or the battery may be dispensed with and the demagnetizing current may be derived from a magnetic-electric apparatus of any well-known and suitable construction.

The force of the residual magnetism employed for the purpose of holding or retaining the signal in position may be greatly increased by making the yokes *e′* and *f′* of hardened steel, or by partially hardening the cores *e e* and *f f*, and it will in most cases be found preferable to construct the magnet in this way. In case a signaling apparatus is so situated as to be exposed to excessive vibration, so that the residual magnetism remaining in the cores of the electro-magnet after the circuit is broken is insufficient to retain the apparatus in position with certainty, a weak current may be made to circulate around the cores *e e* after the primary current has ceased, and in the same direction. This current may be derived from the same battery as the primary current, or from a separate battery, as may be found most convenient. By this means the force of the residual magnetism may be increased to any desired extent.

A bell-signal may be used for communicating between the stations A and B, using the wire 3 and a weaker current, which, though strong enough to operate a magnet for striking a bell, will not be sufficient to affect the semaphoric magnets. This current may be derived from a separate battery, or from the main battery, or a portion thereof, and weakened by being made to pass through a rheostat. This arrangement, however, forms no necessary part of my invention, and, therefore, need not be further described.

When it is desired to operate the signal through a considerable length of line, I employ a relay-magnet, of any suitable construction, in place of the helices E E and their appurtenances. This relay is caused in a manner well understood to close the circuit of a local battery actuating the magnet which moves the signal. The armature of the said relay is held in position after the circuit is broken by means of the residual magnetism, as hereinbefore explained, and thus the local circuit remains closed, and the signal displayed until a demagnetizing current is sent through the helices of the relay.

In case it is found desirable or necessary to employ a bell or other alarm, operated by electro-magnetism or mechanical power, in any suitable manner, in lieu of or in conjunction with a semaphoric signal, I employ a relay, constructed in the manner last described, for the purpose of actuating or controlling the said bell or alarm through the agency of a local circuit.

I make no claim to the method herein shown by which the electro-magnet that actuates a semaphoric signal at a distant station is made to close another circuit and actuate a secondary signal situated at or near the point from which the primary signal is operated, as substantially the same arrangement is set forth in the English patent of W. H. Preece, No. 77, January 10, 1862.

What I claim as my invention, and desire to secure by Letters Patent, is—

1. The combination, with a visual signal, of an electro-magnet and an armature operating to display the signal by direct magnetic attraction, and to hold the same displayed by residual magnetism, substantially as set forth.

2. The combination, with a visual signal, an electro-magnet, and armature operating to display the signal by magnetic attraction, and to hold the same displayed by residual magnetism, of a circuit-closer and opposing circuit for throwing a releasing or demagnetizing current through the coil or coils of the actuating electro-magnet, substantially as set forth.

In testimony that I claim the foregoing I have hereunto set my hand in the presence of the subscribing witnesses.

FRANK L. POPE.

Witnesses:
H. M. HAIGH,
GEORGE S. HAMLIN.